United States Patent [19]
Vaughn

[11] Patent Number: 5,892,438
[45] Date of Patent: Apr. 6, 1999

[54] SIDE REAR VIEW MIRROR SPOTLIGHT DEVICE

[76] Inventor: Roman M. Vaughn, 10841 Meadow Crest Ct., Riverside, Calif. 92505

[21] Appl. No.: 54,245

[22] Filed: Apr. 2, 1998

[51] Int. Cl.⁶ ...................................................... B60Q 1/26
[52] U.S. Cl. ........................... 340/468; 362/494; 362/515
[58] Field of Search ............................ 340/468; 362/494, 362/135, 421, 493, 503, 515, 512; 359/841, 842, 882

[56] References Cited

U.S. PATENT DOCUMENTS

| | | | |
|---|---|---|---|
| 3,266,016 | 8/1966 | Maruyama et al. | 362/494 |
| 4,981,363 | 1/1991 | Lipman | 362/68 |
| 5,598,171 | 1/1997 | Cole | 343/711 |

*Primary Examiner*—Donnie L. Crosland

[57] ABSTRACT

A side rear view mirror spotlight device for providing a directable light source in side rear view mirrors. The device includes a housing with a front portion having an opening into the interior of the housing. A mirror is mounted to the back of the housing. A spot light assembly including a light source located in the interior of the housing is pivotally mounted to the housing to permit pivoting of the light source in the interior of the housing. A handle is coupled to the spot light assembly and extends from the bottom of the housing.

10 Claims, 2 Drawing Sheets

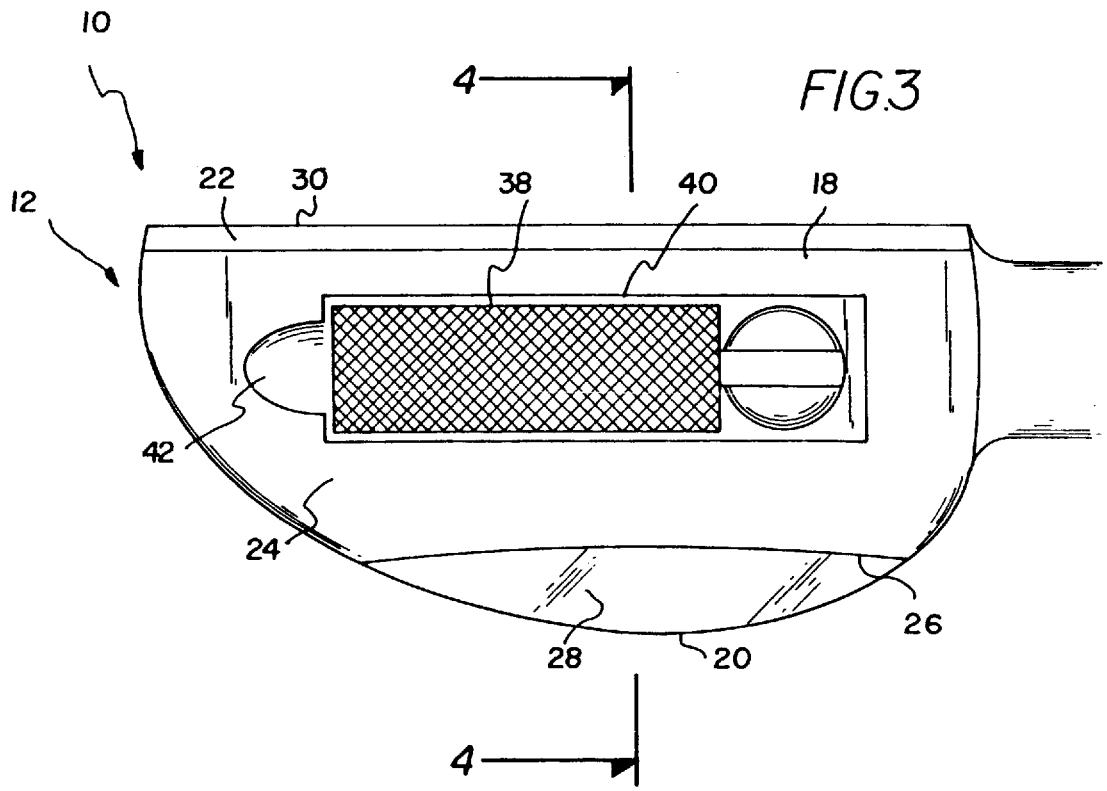
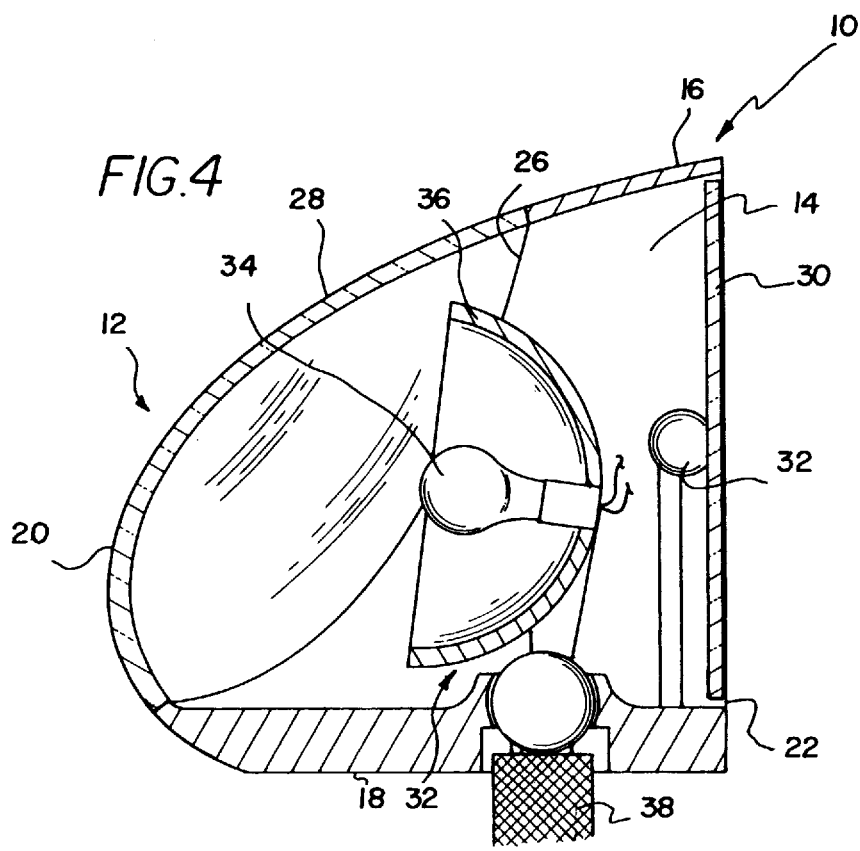

SIDE REAR VIEW MIRROR SPOTLIGHT DEVICE

BACKGROUND OF THE INVENTION

1. Field of the Invention

The present invention relates to side rear view mirrors and more particularly pertains to a new side rear view mirror spotlight device for providing a directable light source in side rear view mirrors.

2. Description of the Prior Art

The use of side rear view mirrors is known in the prior art. More specifically, side rear view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art side rear view mirrors include PCT Patent No. WO 97/15471 (Inventor: O'Farrell); U.S. Pat. No. 4,583,155; U.S. Pat. No. 3,266,016; U.S. Pat. No. 1,969,415; U.S. Pat. No. 4,485,430; U.S. Pat. No. 5,212,468; and PCT Patent No. WO 94/13511 (Inventor: Thone).

While these devices fulfill their respective, particular objectives and requirements, the aforementioned patents do not disclose a new side rear view mirror spotlight device. The inventive device includes a housing with a front portion having an opening into the interior of the housing. A mirror is mounted to the back of the housing. A spot light assembly including a light source located in the interior of the housing is pivotally mounted to the housing to permit pivoting of the light source in the interior of the housing. A handle is coupled to the spot light assembly and extends from the bottom of the housing.

In these respects, the side rear view mirror spotlight device according to the present invention substantially departs from the conventional concepts and designs of the prior art, and in so doing provides an apparatus primarily developed for the purpose of providing a directable light source in side rear view mirrors.

SUMMARY OF THE INVENTION

In view of the foregoing disadvantages inherent in the known types of side rear view mirrors now present in the prior art, the present invention provides a new side rear view mirror spotlight device construction wherein the same can be utilized for providing a directable light source in side rear view mirrors.

The general purpose of the present invention, which will be described subsequently in greater detail, is to provide a new side rear view mirror spotlight device apparatus and method which has many of the advantages of the side rear view mirrors mentioned heretofore and many novel features that result in a new side rear view mirror spotlight device which is not anticipated, rendered obvious, suggested, or even implied by any of the prior art side rear view mirrors, either alone or in any combination thereof.

To attain this, the present invention generally comprises a housing with a front portion having an opening into the interior of the housing. A mirror is mounted to the back of the housing. A spot light assembly including a light source located in the interior of the housing is pivotally mounted to the housing to permit pivoting of the light source in the interior of the housing. A handle is coupled to the spot light assembly and extends from the bottom of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new side rear view mirror spotlight device apparatus and method which has many of the advantages of the side rear view mirrors mentioned heretofore and many novel features that result in a new side rear view mirror spotlight device which is not anticipated, rendered obvious, suggested, or even implied by any of the prior art side rear view mirrors, either alone or in any combination thereof.

It is another object of the present invention to provide a new side rear view mirror spotlight device which may be easily and efficiently manufactured and marketed.

It is a further object of the present invention to provide a new side rear view mirror spotlight device which is of a durable and reliable construction.

An even further object of the present invention is to provide a new side rear view mirror spotlight device which is susceptible of a low cost of manufacture with regard to both materials and labor, and which accordingly is then susceptible of low prices of sale to the consuming public, thereby making such side rear view mirror spotlight device economically available to the buying public.

Still yet another object of the present invention is to provide a new side rear view mirror spotlight device which provides in the apparatuses and methods of the prior art some of the advantages thereof, while simultaneously overcoming some of the disadvantages normally associated therewith.

Still another object of the present invention is to provide a new side rear view mirror spotlight device for providing a directable light source in side rear view mirrors.

Yet another object of the present invention is to provide a new side rear view mirror spotlight device which includes a housing with a front portion having an opening into the interior of the housing. A mirror is mounted to the back of the housing. A spot light assembly including a light source located in the interior of the housing is pivotally mounted to the housing to permit pivoting of the light source in the interior of the housing. A handle is coupled to the spot light assembly and extends from the bottom of the housing.

Still yet another object of the present invention is to provide a new side rear view mirror spotlight device that is adjustable so that a light may be shone in various directions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic bottom side view of the present invention as seen from the vantage of line 3—3 of FIG. 2.

FIG. 4 is a schematic cross sectional view of the present invention taken from line 4—4 on FIG. 3.

DESCRIPTION OF THE PREFERRED EMBODIMENT

Figure 1:
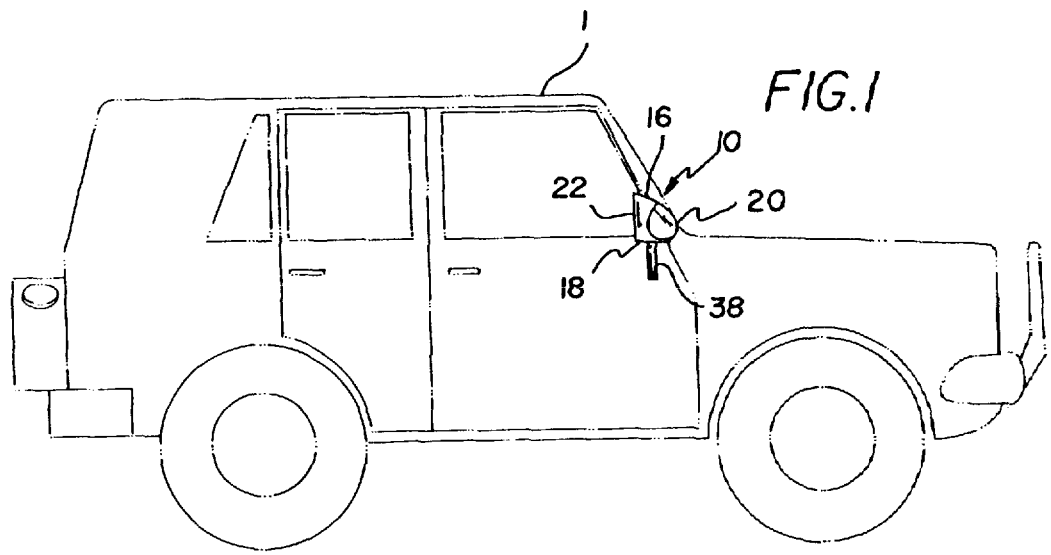
FIG. 1 is a schematic side view of a new side rear view mirror spotlight device in use mounted to the side of a vehicle according to the present invention.

With reference now to the drawings, and in particular to FIGS. 1 through 4 thereof, a new side rear view mirror spotlight device embodying the principles and concepts of the present invention and generally designated by the reference numeral 10 will be described.

The side rear view mirror spotlight device 10 is designed for mounting, including detachable mounting, to a vehicle. As best illustrated in FIGS. 1 through 4, the side rear view mirror spotlight device 10 generally comprises a housing 12 with a front portion 24 having an opening 26 into the interior 14 of the housing 12. A mirror 30 is mounted to the back 22 of the housing 12. A spot light assembly 32 including a light source 34 located in the interior 14 of the housing 12 is pivotally mounted to the housing 12 to permit pivoting of the light source 34 in the interior 14 of the housing 12. A handle 38 is coupled to the spot light assembly 32 and extends from the bottom 18 of the housing 12.

In closer detail, the housing 12 is mountable to a vehicle 1, preferably on the side of the vehicle. The housing 12 has a front portion 24 which is located towards the front 20 of housing 12. Preferably, the front portion 24 is generally arcuate. The front portion 24 has an opening 26 into the interior 14 of the housing 12. The opening 26 is located towards the front 20 of the housing 12. Preferably, a generally transparent lens cover 28 covers the opening 26 of the front portion 24. The back 22 of the housing 12 has a mirror 30 which is pivotally mounted thereto by a pivot mount 31.

The mirror 30 is designed for viewing objects behind the vehicle 1 like a conventional side rear view mirror.

The spot light assembly 32 includes the light source 34, and preferably a reflector 36 which are both located in the interior 14 of the housing 12. The reflector 36 has a reflective concavity which facing the front 20 of the housing 12. The light source 34 is disposed in the reflective concavity. The light source may be battery powered or powered from a power supply of a vehicle. The spot light assembly 32 is pivotally mounted to the housing 12 to permit pivoting of the light source 34 and the reflector 36 in the interior 14 of the housing 12 so that the light from the light source may be directed towards a particular direction by a user.

Figure 2:
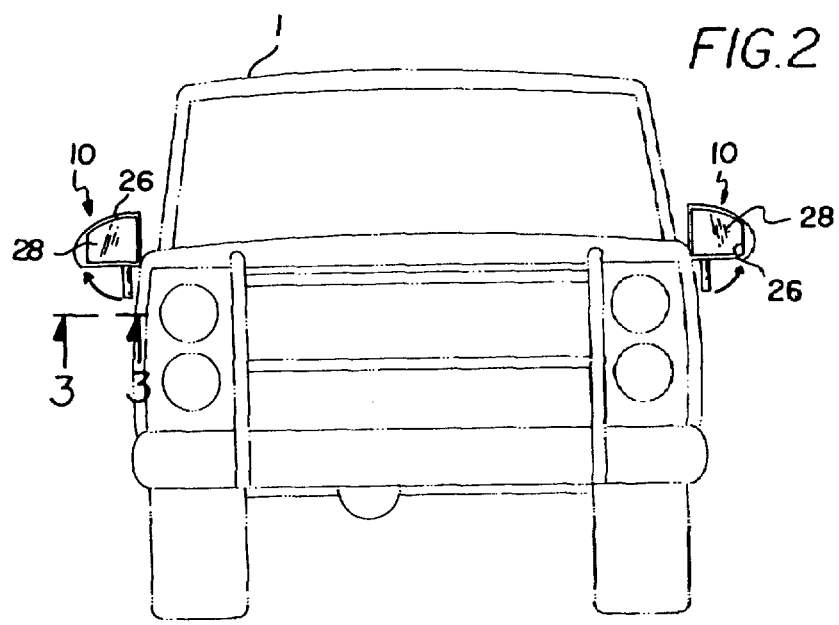
FIG. 2 is a schematic front view of a pair of the present invention mounted to either side of a vehicle.

The handle 38 is pivotally coupled to the spot light assembly 32 to permit extension of the handle 38 from the exterior of the housing 12. Preferably, the handle 38 extends from the bottom 18 of the housing 12. The handle 38 is designed for allowing a user to direct the direction of the light source 34 to aim at particular targets and areas. In the preferred embodiment, the handle 38 is pivotable between an extended position (as illustrated in FIGS. 2 and 4) and a retracted position (as illustrated in FIG. 3). Preferably, the length of the handle 38 is generally perpendicular to a plane defined by the bottom 18 of the housing 12 when in the extended position, while in the retracted position, the length of the handle 38 is preferably generally parallel to a plane defined by the bottom 18 of the housing 12.

Preferably, the bottom 18 of the housing 12 has a recess 40 for receiving the handle 38 when the handle 38 is pivoted towards the retracted position. Ideally, the recess 40 has a portion 42 adapted for inserting a finger therein for aiding the removal of the handle 38 from the recess 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side rear view mirror spotlight device for mounting to a vehicle, said device comprising:

a housing having an interior, a top, a bottom, a front, and a back, said housing being mountable to a vehicle;

said housing having a front portion being located towards said front of housing, said front portion having an opening into said interior of said housing, said opening being located towards said front of said housing;

said back of said housing having a mirror being mounted thereto;

a spot light assembly including a light source, said light source being located in said interior of said housing, said spot light assembly being pivotally mounted to said housing to permit pivoting of said light source in said interior of said housing; and a handle being coupled to said spot light assembly, said handle being extended from said bottom of said housing.

2. The device of claim 1, wherein said front portion of said housing is generally arcuate.

3. The device of claim 1, further comprising a generally transparent cover covering said opening of said front portion.

4. The device of claim 1, wherein said mirror is pivotally mounted to said back of said housing.

5. The device of claim 1, wherein said spot light assembly further includes a reflector, said reflector being located in said interior of said housing, wherein said reflector has a reflective concavity, said light source being disposed in said reflective concavity, said reflective concavity facing said front of said housing.

6. The device of claim 1, wherein said handle is pivotally coupled to said spot light assembly to permit extension of said handle from the exterior of said housing, wherein said handle is pivotable between an extended position and a retracted position.

7. The device of claim 6, wherein the length of said handle is generally perpendicular to a plane defined by said bottom of said housing when in said extended position, and wherein the length of said handle is generally parallel to a plane defined by said bottom of said housing when in said retracted position.

8. The device of claim 6, wherein said bottom of said housing has a recess for receiving said handle when said handle is pivoted towards said retracted position.

9. The device of claim 8, wherein said recess has a portion adapted for inserting a finger therein for aiding the removal of said handle from said recess.

10. A side rear view mirror spotlight device for mounting to a vehicle, said device comprising:

a housing having an interior, a top, a bottom, a front, and a back, said housing being mountable to a vehicle;

said housing having a front portion being located towards said front of housing, said front portion being generally arcuate, said front portion having an opening into said interior of said housing, said opening being located towards said front of said housing;

a generally transparent cover covering said opening of said front portion;

said back of said housing having a mirror being pivotally mounted thereto;

a spot light assembly including a light source, and a reflector, said light source and said reflector being located in said interior of said housing, said spot light assembly being pivotally mounted to said housing to permit pivoting of said light source and said reflector in said interior of said housing;

said reflector having a reflective concavity, said light source being disposed in said reflective concavity, said reflective concavity facing said front of said housing;

a handle being pivotally coupled to said spot light assembly to permit extension of said handle from the exterior of said housing, said handle being extended from said bottom of said housing;

said handle being pivotable between an extended position and a retracted position, wherein the length of said handle is generally perpendicular to a plane defined by said bottom of said housing when in said extended position, wherein the length of said handle is generally parallel to a plane defined by said bottom of said housing when in said retracted position; and said bottom of said housing having a recess for receiving said handle when said handle is pivoted towards said retracted position, said recess having a portion adapted for inserting a finger therein for aiding the removal of said handle from said recess.

* * * * *